United States Patent [19]

Barnoach

[11] Patent Number: 4,911,778

[45] Date of Patent: Mar. 27, 1990

[54] APPARATUS FOR FORMING PLASTICS COATED TUBE

[75] Inventor: Itzhak Barnoach, London, England

[73] Assignee: Kitechnology, B.V., Netherlands

[21] Appl. No.: 112,032

[22] Filed: Oct. 23, 1987

[30] Foreign Application Priority Data

Oct. 23, 1986 [GB] United Kingdom ............... 8625432

[51] Int. Cl.$^4$ .................... B29D 23/04; B29D 23/10
[52] U.S. Cl. .................... 156/466; 156/203; 156/218; 156/244.13; 156/465; 264/173; 264/209.1; 425/110; 425/113
[58] Field of Search .................. 72/51, 52; 228/130, 228/173.7; 29/33 D; 156/203, 218, 244.13, 465, 466, 467; 264/173, 209.1; 425/110, 113

[56] References Cited

U.S. PATENT DOCUMENTS

| | | | |
|---|---|---|---|
| 1,586,249 | 5/1926 | Krogh et al. | 228/130 |
| 2,461,372 | 2/1948 | Collins | 156/466 X |
| 2,700,408 | 1/1955 | Babbitt . | |
| 3,202,563 | 8/1965 | Charvet | 156/466 X |
| 3,280,609 | 10/1966 | Lehnert . | |
| 3,376,181 | 4/1968 | Larson | 156/466 X |
| 3,388,017 | 6/1968 | Grimsley et al. | 156/203 |
| 3,433,043 | 3/1969 | Vermeulen et al. . | |
| 4,370,186 | 1/1983 | Blandin et al. | 156/218 X |
| 4,403,491 | 9/1983 | Wassen et al. | 72/52 |
| 4,404,720 | 9/1983 | Bohannon, Jr. | 29/33 D |

FOREIGN PATENT DOCUMENTS

| | | | |
|---|---|---|---|
| 2805735 | 8/1979 | Fed. Rep. of Germany | 72/52 |
| 3044003 | 6/1982 | Fed. Rep. of Germany . | |
| 2434326 | 3/1980 | France . | |
| 2463675 | 2/1981 | France . | |
| 54-52183 | 4/1979 | Japan | 156/218 |
| 1169287 | 11/1969 | United Kingdom . | |
| 1304879 | 1/1973 | United Kingdom . | |
| 2042673 | 9/1980 | United Kingdom . | |

*Primary Examiner*—David Simmons
*Assistant Examiner*—Jeff H. Aftergut
*Attorney, Agent, or Firm*—Lowe, Price, LeBlanc, Becker & Shur

[57] ABSTRACT

Apparatus for forming a plastics coated metal tube comprising means for forming a continuous strip of metal into a U-shape and a forming sleeve for folding the strip into an overlapping tube. A mandrel is also provided which extends through the forming sleeve and through a locating sleeve. The locating sleeve centralizes the tube as it passes over the mandrel and welding means are provided for welding the overlapping tube as it passes through the locating sleeve. Both the forming sleeve and the locating sleeve are mounted on the mandrel so as to float with the mandrel.

18 Claims, 7 Drawing Sheets

APPARATUS FOR FORMING PLASTICS COATED TUBE

The present invention relates to apparatus for forming plastics coated metal or metal alloy tube.

There is a need in many industries for a lightweight easily bendable tube which combines the characteristics of both metal and plastics. It has been found that a tube made from a thin aluminum strip coated on both the inner and outer surfaces with a plastics material such as a polyethylene has many advantageous characteristics. It is light, can be easily bent, has good corrosion resistance, improved fluid flow characteristics and can be easily connected and jointed.

This type of plastics coated tube and its method of manufacture is disclosed in U.S. Pat. No. 4370186. That specification discloses a method of manufacture in which a strip of aluminium is folded into a tubular form, seamed and then passed over a mandrel. Plastics material is then extruded from the mandrel onto the inner surface of the aluminium tube and the tube then passes through a bush where a layer of plastics is extruded onto the outer surface of the tube. However, this method and the apparatus for carrying out the method of manufacture give rise to a number of problems. For instance, the mandrel being supported only at one end will have some movement at its free end which may result in an uneven layer of plastics being extruded onto the inner surface of the tube. It is also difficult to maintain the temperature of the plastics material within the mandrel. The mandrel being of smaller diameter than the tube itself cannot accommodate heating elements and the plastics material will not flow freely if the temperature is not maintained. Both of these problems may be reduced if the length of the mandrel can be kept to a minimum.

It is therefore an object of the present invention to provide apparatus for forming a plastics coated tube which obviates or reduces the problems encountered hitherto and in particular which enables the length of the mandrel to be as short as possible and any imperfections arising from movement of the mandrel to be minimized.

According to one aspect of the present invention, provided is an apparatus for forming a plastics coated metal tube comprising means for forming a continuous strip of metal into a U-shape, a forming sleeve for folding the strip into an overlapping tube, a mandrel extending through the forming sleeve, a locating sleeve for locating the tube as it passes over the mandrel, welding means for welding the overlapping tube as it passes through the locating sleeve and means for extruding plastics material from the mandrel onto the inner surface of the tube as it passes over the mandrel, characterised in that the forming sleeve and the locating sleeve are mounted on the mandrel so as to float therewith.

A preferred form of the invention will now be described with reference to the accompanying drawings in which.

Figure 1:
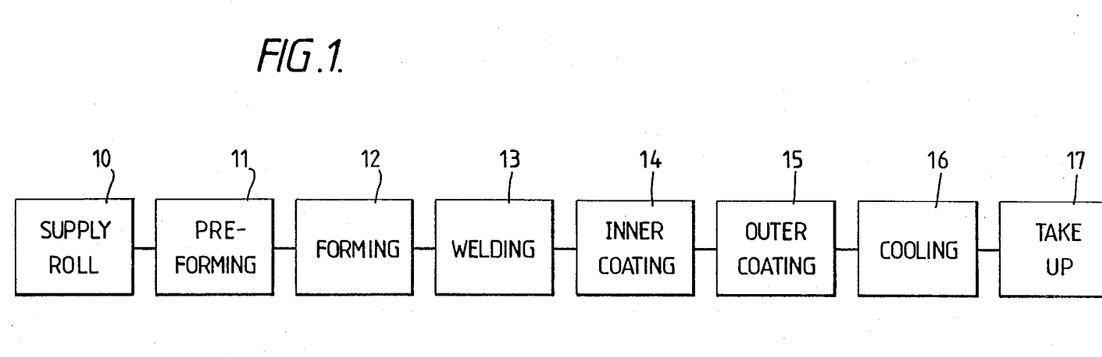
FIG. 1 is a block diagram of the method steps entailed in the tube forming method of the present invention.
Figure 2:
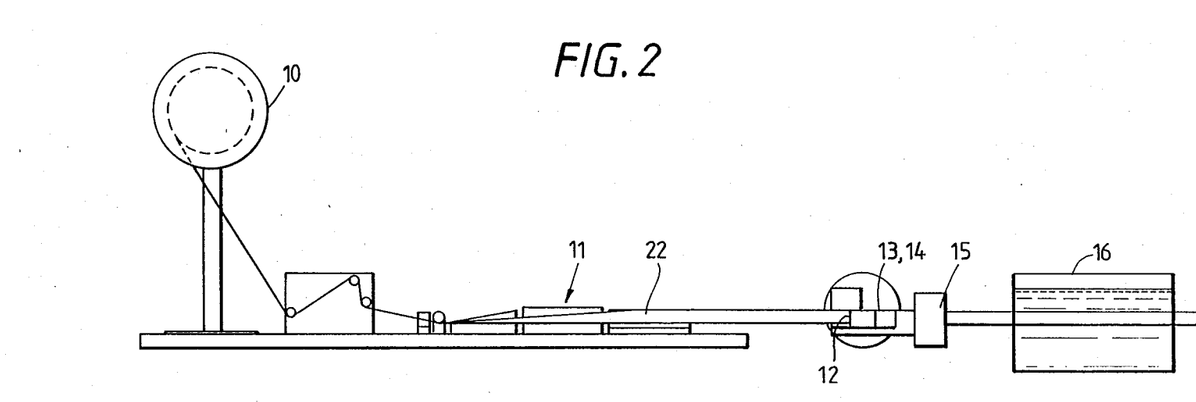
FIG. 2 is an elevation in diagrammatic form of apparatus for carrying out the method of the present invention.
Figure 3:
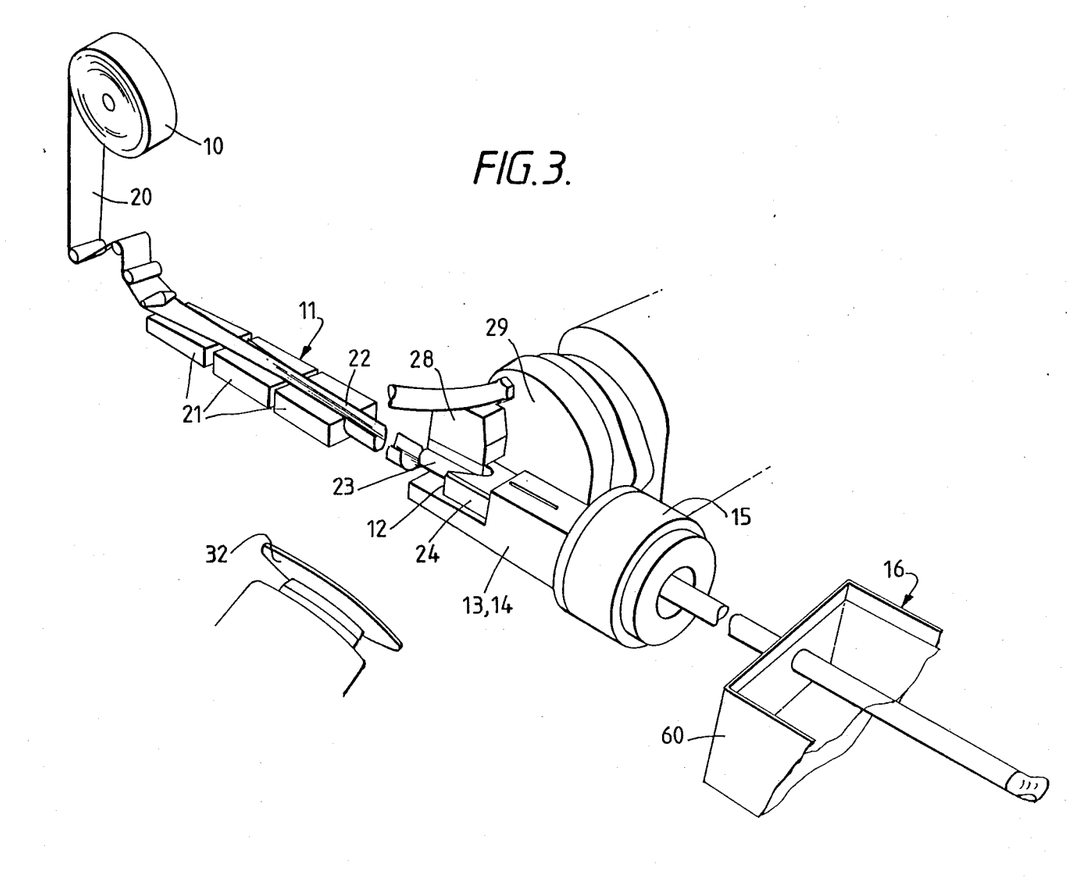
FIG. 3 is a perspective view of the apparatus shown in FIG. 2.

In the drawings FIG. 1 is a block diagrammatic illustration of the method and apparatus of forming a plastics coated pipe of the present invention, which comprises passing a flat strip of aluminium approximately 0.2 mm thick guage from a supply roll 10 to a performing station 11 where the flat strip is formed into a U section strip. From the pre-forming station 11, the U section strip passes to a forming station 12 where it is formed into an overlapping tube which then passes to a welding station 13 and from these to an inner coating station 14. At the welding station the overlapping aluminium tube is welded and immediately after welding an inner coating of plastics material is extruded onto the inner surface of the tube. The partially coated tube then passes to an outer coating station 15 where an outer coating of plastics material is extruded onto the outer surface of the tube. The coated tube is then passed through a cooling station 16 and from there to a take-up station 17 where it is wound onto a take-up roll.

Figure 5:
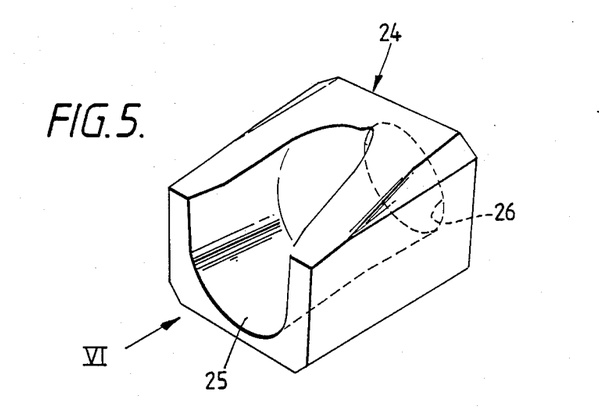
FIG. 5 is a perspective view of the forming sleeve shown in FIG. 4.
Figure 6:
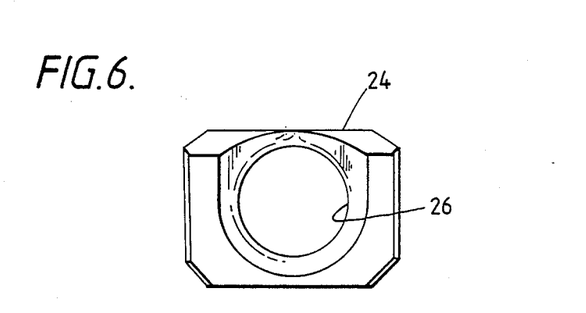
FIG. 6 is an end view of the sleeve of FIG. 5.

The apparatus of the present invention will now be described in more detail. An aluminium strip 20 is drawn from the supply roll 10 and then passes through a series of forming blocks 21 where it is formed into a U section strip 22. The thickness of the aluminium strip will depend upon the pressure that the finished pipe is designed to withstand but will normally be very thin. The forming process therefore takes place gradually in order to minimize stress and distortion of the metal. The U section strip 22 then passes over one end of a mandrel 23 and into a forming sleeve 24 which is mounted on the mandrel 23. The forming sleeve 24 is shown in greater detail in FIG. 5. It is formed from a hard polyimide resin and has a funnel shaped tapering channel 25 leading to a generally circular outlet 26. As can be seen from FIG. 6 the outlet 26 is asymmetrical so that the aluminium strip is formed into an overlapping pipe as it leaves the sleeve 24. For reasons which will be apparent, the length of the tapering channel 25 is in the ranges of two to three times the diameter of the outlet 26, but preferably two and one half times the diameter so that the aluminium strip is formed from a U section strip into an overlapping tube 27 over a relatively short distance. The internal diameter of the tube will normally range between 10 mm and 75 mm.

Figure 4:
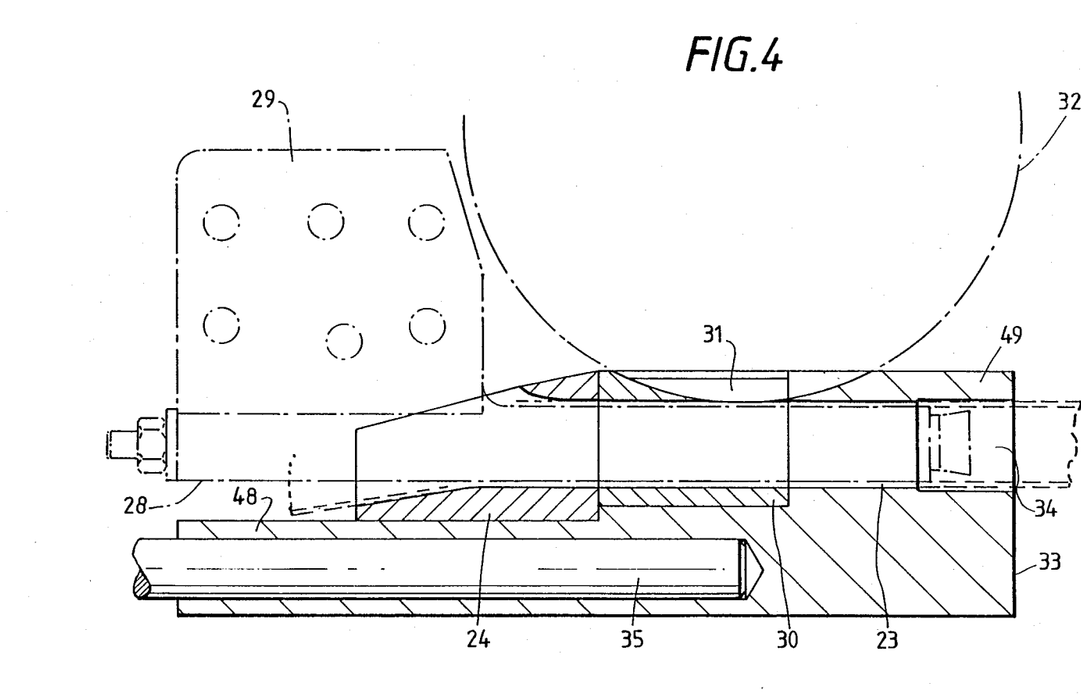
FIG. 4 is a section through a detail of the apparatus shown in FIGS. 2 and 3.

The mandrel 23 is mounted on and projects from an arm 28 which forms part of a manifold 29. As can be seen best from FIG. 4, the arm 28 which supports the mandrel 23, extends into the channel 25 of the forming sleeve 24 and the mandrel 23 then extends through the outlet 26 so that the strip is folded into an overlapping tube 27 around the mandrel 23 as it emerges from the outlet 26 of the forming sleeve 24.

From the forming sleeve 24, the overlapping tube 27 passes through a locating sleeve 30, which is made from the same material as the forming sleeve 24. The locating sleeve 30 has a welding slot 31 on one side and is generally circular so as to hold the form of the overlapping tube 27 as it is welded by an ultrasonic welding wheel 32. The welding wheel 32 is mounted separately from the mandrel 23 and manifold 29 so that it can be brought into position over the locating sleeve 30 and lowered into the welding slot 31 to weld the tube along the overlap. As the welding operation takes place, the mandrel 23 acts as an anvil, the tube 27 being clamped between the wheel 32 and the mandrel during the welding operation.

Both the forming sleeve 24 and the locating sleeve 30 are located within a sleeve housing 33 which is carried on the mandrel 23. The sleeve housing 33 has a through bore 34 and a plurality of heating elements 35 which maintain the temperature of the housing 33 and thus the temperature around the mandrel 23.

Figures 7, 8:
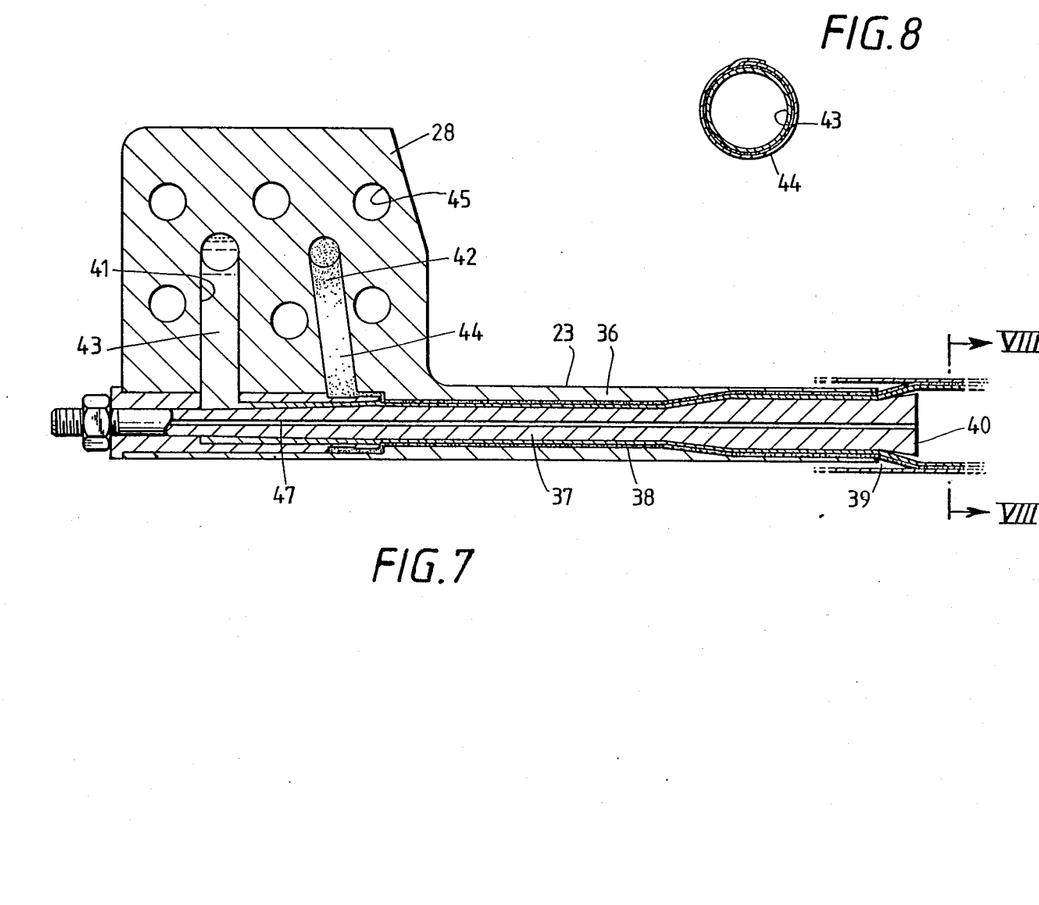
FIG. 7 is a section taken through the mandrel of the apparatus shown in FIG. 4.
FIG. 8 is a section taken through the line VIII—VIII of FIG. 7.

As can be seen best from FIG. 7, the mandrel 23 comprises an outer cylindrical wall 36 and a core 37, the gap between the core 37 and the wall 36 defining an annular passageway 38 which terminates in an annular orifice 39 close to the leading end or tip 40 of the mandrel. The annular passageway 38 is connected to and fed by two separate conduits 41 and 42 which communicate through the supporting arm 28 with the manifold 29. Plastics material for coating the inner surface of the welded tube 27 is fed from the manifold 29 to the conduit 41 and plastics adhesive material 44 for bonding the plastics material 43 to the inner surface of the aluminium tube is fed from the mandrel 29 through the conduit 42.

The arm 28 is provided with a plurality of heating elements 45 to maintain the plastics and plastics adhesive material in a hot melt flowable form so that they will flow readily through the conduits 41 and 42 and along the annular passageway 38 in the mandrel 23. The plastics material 43 may conveniently be a polyethylene and the adhesive material 44 for bonding the polyethylene to the inner surface of the aluminium tube may be a grafted polyethylene. However, any suitable plastics and plastics adhesive materials may be used to ensure a good bond onto the inner surface of the aluminium tube.

As the welded tube 27 passes over the annular orifice 39 adjacent the tip 40 of the mandrel, the adhesive material 44 is extruded onto the inner surface of the tube and the plastics material 43 is extruded on top of the adhesive plastics 44. As can be seen from FIG. 7, an air line 47 extends through the core 37 of the mandrel and air under pressure is subjected into the tube from the end of the mandrel so as to create a permanent pressure within the tube which assists in laying the plastics material onto the inner surface of the tube and serves also, in a manner to be described, to detect any faults which may have occurred in the welding of the aluminium strip.

The forming sleeve 24 and the locating sleeve 30 are carried by the sleeve housing 33 which, together with the sleeves 24 and 30, is carried on the mandrel 23 so as to float and move with the mandrel. As can be seen best from FIG. 4, the housing 33 is L shaped and has a lower portion 48 on which the forming sleeve is seated and an upper portion 49 formed with the bore 34 into which the mandrel 23 extends.

Figures 9, 10:
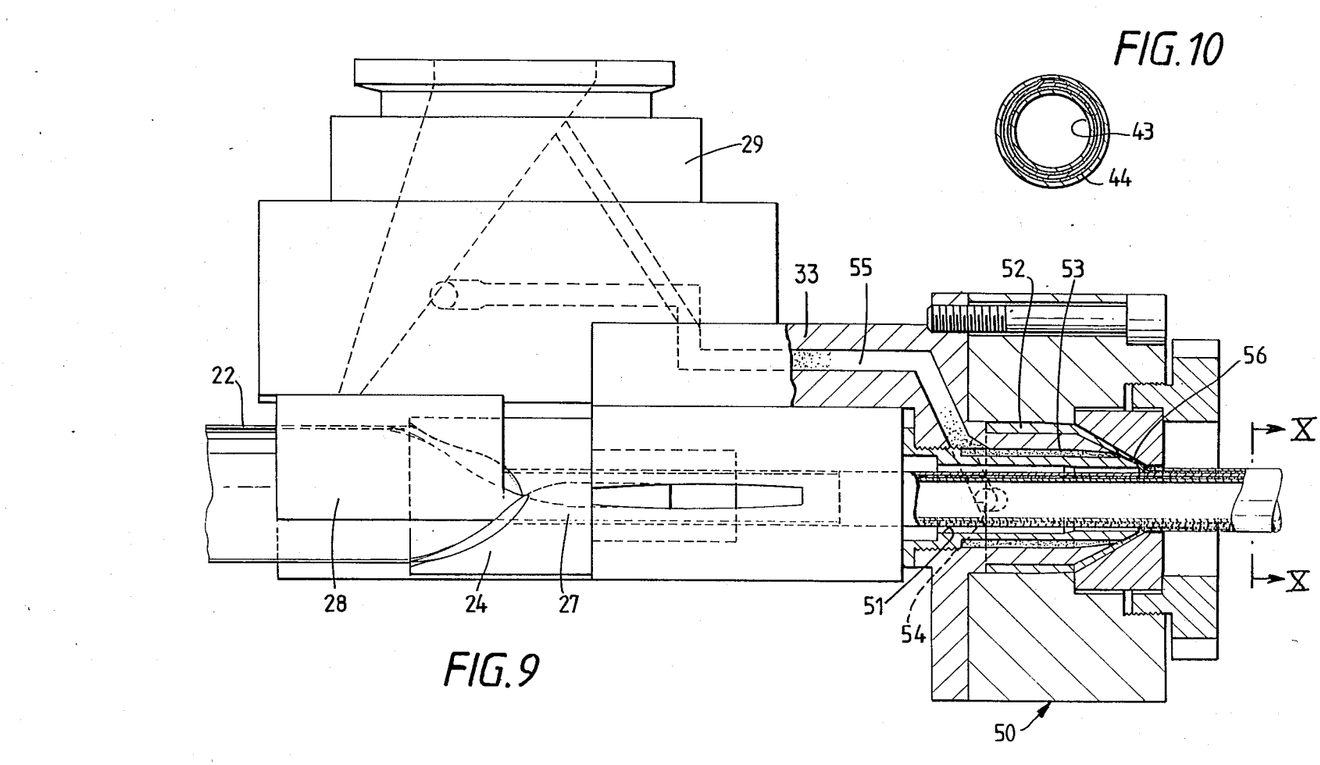
FIG. 9 is a section taken through a further part of the apparatus shown in FIGS. 2 and 3.
FIG. 10 is a section taken on the line X—X of FIG. 9.

Closely adjacent the end of the housing 33 is a bush 50 which is removably attached to the manifold 29 and which is formed with a bore 51 through which the welded tube 27 passes when it emerges from the housing 33. The bush 50 is formed with annular passageways 52 and 53 which communicate with conduits 54 and 55, respectively; in the manifold 29. The annular passageways 52 and 53 merge into an annular orifice 56 which opens into the bore 51. A plastics material, such as polyethylene, is fed from the manifold 29 through the passageway 54 and an adhesive material such as a cross-linkable polyethylene is fed from the manifold through the passageway 55. As can be seen from FIG. 9, as the annular passageway 53 is positioned radially inwardly of the annular passageway 52, the adhesive material is laid onto the outer surface of the tube as the tube passes through the bore 51 past the orifice 56 and the plastics material is thus laid on top of the adhesive.

As the tube emerges from the bush 50 it has an inner coating of polyethylene bonded to the inner surface of the tube by a cross linked polyethylene and a similar outer coating of polyethylene also bonded to the outer surface of the tube by a cross-link polyethylene. From the bush 50, the coated tube passes through a cooling water bath 60 and from there to a take up roll, which is not shown.

One of the problems which has to be overcome in coating the inner surface of a tube with plastics material is to maintain the temperature of the plastics material so that it will flow readily along the mandrel. Since the mandrel must be of smaller diameter than the internal diameter of the tube, it is not possible to provide heating elements within the mandrel as well as the conduits for the plastics material. We have overcome this problem, firstly by keeping the mandrel relatively short and, secondly, by heating the housing 33 for the forming sleeve 24 and locating sleeve 30 so that the ambient temperature surrounding the mandrel is maintained at a sufficiently high level.

Further, in order to shorten the length of the mandrel we form the aluminium strip from a U section into an overlapping tube ready for welding over a very short distance. We then weld the overlapping tube and extrude the plastics material onto the inner surface of the tube simultaneously. We have achieved these objectives by providing the forming sleeve with a funnel shaped bore which forms the aluminium strip from a U shape into an asymmetric overlapping tube over a short distance of approximately twice the diameter of the finished tube. The overlapping tube is then welded immediately as it is formed and the inner surface coated with plastics material from the mandrel immediately downstream of the welding station.

We have also found that, by shortening the length of the mandrel to the absolute minimum, movement of the mandrel at the tip of the mandrel is reduced although not necessarily eliminated. Movement of the tip of the mandrel at the point at which plastics material is extruded onto the inner surface of the tube causes variations in the thickness of the plastics material extruded onto the inner surface of the tube but we have found that these variations are reduced by mounting the housing 33 and the sleeves 24 and 30 on the mandrel so that they float with the mandrel.

The forming sleeve 24, although formed from a relatively hard material is subject to wear. It can however be relatively easily replaced by removing the bush 50 and sliding the housing 33 off the mandrel. The sleeve 24 and the sleeve 30 can then be replaced.

For a variety of reasons, it can happen that the weld of the overlapping tube is faulty. Imperfections in the welding of the tube can be detected if the end of the tube is initially pinched and sealed as it comes through the apparatus so that it is placed under internal air pressure through the air line 47. Any faults in the tube weld will cause air to escape from the tube as it passes through the cooling bath 60 and the bubbles of air will be readily apparent indicating a fault in the weld. Alternatively, a sensing mechanism may be provided to sense a drop in pressure within the tube at any point downstream of the welding station. As the plastics on the internal and external surfaces of the tube is still relatively soft when the tube enters the cooling bath, the pressure of air within the tube will blow through the soft plastics at any point where there is a fault in the weld. Alternatively, a sensing mechanism may be provided to sense a drop in pressure within the tube at any point downstream of the welding station.

The welding operation is preferably carried out by a known type of ultrasonic welding wheel which extends through the slot 31 in the locating sleeve 30 and presses the overlapping edges of the tube against the mandrel 23 which thus acts as an anvil for the welding wheel during the welding operation.

I claim:

1. Apparatus for forming a plastics coated metal tube comprising means for forming a continuous strip of metal into a U-shape, a forming sleeve for folding the strip into an overlapping tube having overlapping edges, a mandrel extending through the forming sleeve for providing, at a downstream end of the mandrel, plastics material coating an inner surface of the tube, a locating sleeve for locating the tube as it passes over the mandrel, welding means for welding the overlapping edges as the tube passes through the locating sleeve, the forming sleeve and the locating sleeve being mounted on the mandrel to thereby reduce variations in thickness of plastic extruded onto the inner surface of the tube.

2. Apparatus as claimed in claim 1, further including means for extruding a layer of plastics onto an outer surface of the tube.

3. Apparatus of claim 1, wherein said locating sleeve and forming sleeve are mounted on the mandrel so as to float and move on the mandrel and thereby be self-centering around the mandrel.

4. Apparatus as claimed in claim 1, wherein said forming sleeve and locating sleeve are slidably mounted onto the mandrel and retained thereon without fastening members extending radially between the sleeves and the mandrel.

5. Apparatus as claimed in claim 1, wherein the locating sleeve is formed with a slot giving access to the overlapping edges of the tube.

6. Apparatus as claimed in claim 5, characterised in that the locating sleeve is made from a polyimide resin.

7. Apparatus as claimed in claim 1, further including a sleeve housing which carries the forming sleeve and the locating sleeve, said sleeve housing being carried on the mandrel.

8. Apparatus of claim 7, wherein said locating sleeve and forming sleeve are mounted on the mandrel so as to float and move on the mandrel so as to be self-centering around the mandrel.

9. Apparatus as claimed in claim 7, wherein said forming sleeve and locating sleeve are slidably mounted onto the mandrel and retained thereon without fastening members extending radially between the sleeves and the mandrel.

10. Apparatus as claimed in claim 7, wherein the sleeve housing is provided with heating means for maintaining an ambient temperature surrounding the mandrel.

11. Apparatus as claimed in claim 10, wherein the forming sleeve has a funnel shaped channel terminating in a generally circular outlet.

12. Apparatus as claimed in claim 11, wherein the length of a channel in the forming sleeve is between two and three times the diameter of the circular outlet.

13. Apparatus as claimed in claim 12, wherein the length of the channel in the forming sleeve is approximately two and one half times the diameter of the circular outlet.

14. Apparatus as claimed in claim 11, wherein the outlet of the forming sleeve is asymmetrical so as to form a generally circular tube having overlapping edges.

15. Apparatus as claimed in claim 14, wherein the forming sleeve is made from a polyimide resin.

16. Apparatus for forming a plastics coated metal tube comprising means for forming a continuous strip of metal into a U-shape, a forming sleeve for folding the strip into an overlapping tube having overlapping edges, a mandrel extending through the forming sleeve for providing, at a downstream end of the mandrel, plastics material coating an inner surface of the tube, a locating sleeve for locating the tube as it passes over the mandrel, welding means for welding the overlapping edges as the tube passes through the locating sleeve, the forming sleeve and the locating sleeve being mounted on the mandrel so as to thereby reduce variations in thickness of plastic extruded onto the inner surface of the tube, further including a sleeve housing which carries the forming sleeve and the locating sleeve, said sleeve housing being carried on the mandrel, further including means for extruding a layer of plastics onto an outer surface of the tube wherein the means for extruding a layer of plastics onto the outer surface of the tube comprises a bush positioned downstream of the downstream end of the mandrel, the bush being positioned closely adjacent the sleeve housing and to locate the sleeve housing on the mandrel.

17. Apparatus of claim 16, wherein said locating sleeve and forming sleeve are mounted on the mandrel so as to float and move on the mandrel so as to be self-centering around the mandrel.

18. Apparatus as claimed in claim 16, wherein said forming sleeve and locating sleeve are slidably mounted onto the mandrel and retained thereon without fastening members extending radially between the sleeves and the mandrel.

* * * * *